(12) United States Patent
Davies et al.

(10) Patent No.: US 11,431,262 B2
(45) Date of Patent: Aug. 30, 2022

(54) POWER CONVERSION METHOD AND SYSTEM

(71) Applicants: Kevin Stephen Davies, Duncraig (AU); Alexander Philip Davies, Duncraig (AU)

(72) Inventors: Kevin Stephen Davies, Duncraig (AU); Alexander Philip Davies, Duncraig (AU)

( * ) Notice: Subject to any disclaimer, the term of this patent is extended or adjusted under 35 U.S.C. 154(b) by 206 days.

(21) Appl. No.: 15/316,819

(22) PCT Filed: Jun. 5, 2015

(86) PCT No.: PCT/AU2015/050315
§ 371 (c)(1),
(2) Date: Dec. 6, 2016

(87) PCT Pub. No.: WO2015/184512
PCT Pub. Date: Dec. 10, 2015

(65) Prior Publication Data
US 2017/0126024 A1 May 4, 2017

(30) Foreign Application Priority Data

Jun. 6, 2014 (AU) .................... 2014902176
Jul. 14, 2014 (AU) .................... 2014902713
Feb. 27, 2015 (AU) .................... 2015900710

(51) Int. Cl.
*H02M 7/483* (2007.01)
*H02H 9/02* (2006.01)
(Continued)

(52) U.S. Cl.
CPC .......... *H02M 7/483* (2013.01); *H01M 10/441* (2013.01); *H02H 9/026* (2013.01);
(Continued)

(58) Field of Classification Search
CPC .......... H02J 7/007; H02J 7/345; H02M 7/483; H02M 2001/0074; H02M 7/42; H02M 7/66; H02M 3/33592
(Continued)

(56) References Cited

U.S. PATENT DOCUMENTS 4,400,655 A * 8/1983 Curtiss .................. H02J 3/1892
                                                        318/729
4,855,891 A * 8/1989 Paul ...................... H01F 27/324
                                                     363/56.08
(Continued)

FOREIGN PATENT DOCUMENTS

WO    WO-2012016285 A1 * 2/2012 ............. H02J 3/385

*Primary Examiner* — David V Henze-Gongola
*Assistant Examiner* — Tarikh Kanem Rankine
(74) *Attorney, Agent, or Firm* — Tope-McKay & Associates

(57) ABSTRACT

A system (10) for converting power comprising a plurality of modules (14) connected in series and having each at least one DC power source. Storage devices (18) are provided with each module (14) to store power from the power source and voltage control circuitry (19) in each module (14) connects the storage device between a maximum module voltage, a minimum module voltage to create a stepwise approximation of a mains signal. A compensator unit (20) is provided in series with the modules (14) including a storage device charged by the power sources. While each of the modules (14) is supplying either its maximum or minimum voltage to the system a control unit ramps up or down the voltage between the input and output of the compensator unit (20) to follow the desired AC signal. When the control unit operates a module (14) to vary the supplied voltage from either zero to the maximum or minimum values, or vice versa, the control unit applies via compensator voltage
(Continued)

control circuitry a corresponding but opposed change in the voltage supplied by the compensator unit (20).

34 Claims, 6 Drawing Sheets

(51) Int. Cl.
    *H01M 10/44*     (2006.01)
    *H02J 7/00*     (2006.01)

(52) U.S. Cl.
    CPC ............ *H02J 7/007* (2013.01); *H02J 7/0013* (2013.01); *H02M 7/4835* (2021.05)

(58) Field of Classification Search
    USPC ............................. 363/15; 307/77; 320/103
    See application file for complete search history.

(56) References Cited

U.S. PATENT DOCUMENTS

| | | | |
|---|---|---|---|
| 4,955,069 A * | 9/1990 | Ionescu | H02H 3/021 |
| | | | 361/31 |
| 8,693,228 B2 * | 4/2014 | Matan | H02J 3/18 |
| | | | 363/97 |
| 8,829,723 B2 * | 9/2014 | Graovac | H02M 7/79 |
| | | | 307/82 |
| 9,130,458 B2 * | 9/2015 | Crookes | H02J 3/1835 |
| 9,450,274 B2 * | 9/2016 | Vo | H01M 10/4257 |
| 9,531,297 B2 * | 12/2016 | Davies | H02J 3/385 |
| 9,755,453 B2 * | 9/2017 | Kanai | H01M 10/482 |
| 2008/0055940 A1 * | 3/2008 | Lawson | H02M 1/10 |
| | | | 363/16 |
| 2012/0043823 A1 * | 2/2012 | Stratakos | H02J 3/383 |
| | | | 307/82 |
| 2012/0217938 A1 * | 8/2012 | Sagneri | H02M 3/158 |
| | | | 323/205 |
| 2013/0077364 A1 * | 3/2013 | Urienza | H02M 7/2176 |
| | | | 363/84 |
| 2013/0200711 A1 * | 8/2013 | Davies | H02J 3/385 |
| | | | 307/77 |
| 2013/0278182 A1 * | 10/2013 | Perisic | B60L 15/025 |
| | | | 318/400.02 |
| 2014/0015488 A1 * | 1/2014 | Despesse | H01M 10/425 |
| | | | 320/122 |
| 2014/0145615 A1 * | 5/2014 | Goscha | H05B 41/2806 |
| | | | 315/85 |
| 2014/0268888 A1 * | 9/2014 | Lv | H02M 1/088 |
| | | | 363/10 |
| 2015/0009734 A1 * | 1/2015 | Stahl | H02M 7/483 |
| | | | 363/98 |

\* cited by examiner

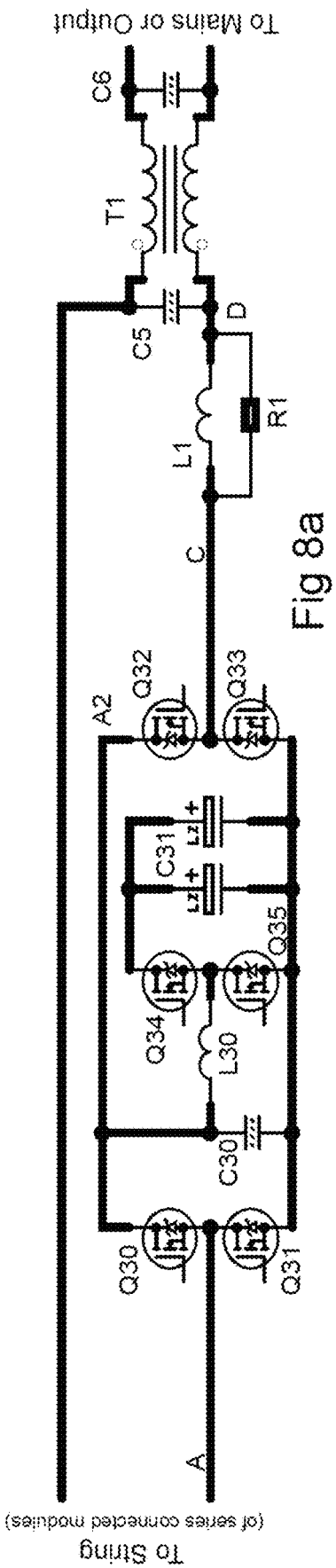
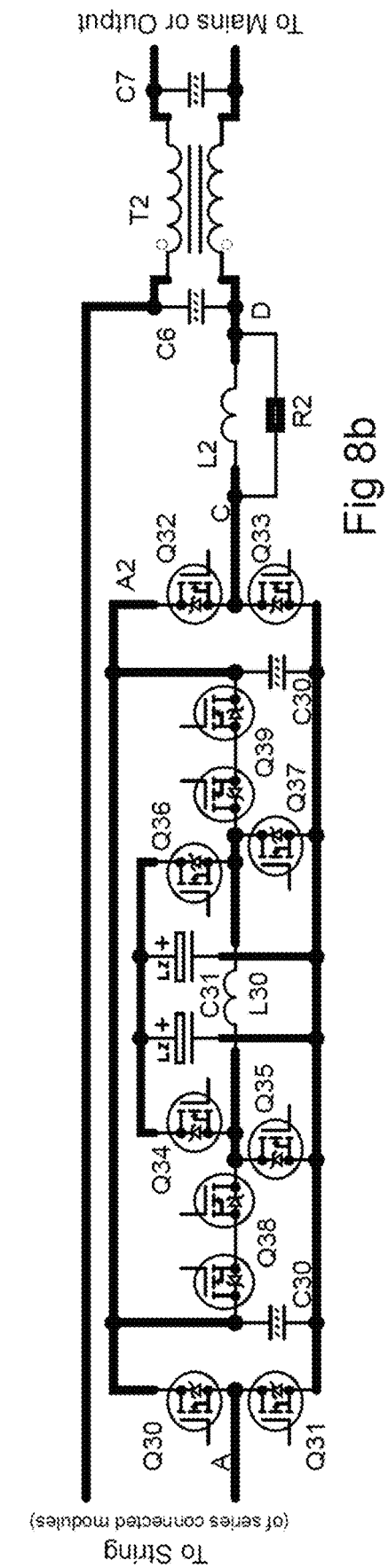

POWER CONVERSION METHOD AND SYSTEM

FIELD OF THE INVENTION

The present invention relates to a system and method for converting power between DC power and AC power

BACKGROUND TO THE INVENTION

There are a number of applications in which conversion is required between DC power and AC power. The applicant's earlier International patents, published under numbers WO2012/016285 and WO2013/023248, describe such systems having improved methods of performing this conversion.

The systems described provide for creation of an AC signal suitable for power supply or injection into mains power from DC sources consisting of a string of modules each connected to a DC power source. The modules are switched in an out of series in order to form a stepwise approximation of an AC signal and further ramping is performed to allow the signal to more closely resemble a smooth AC signal.

The systems of WO2012/016285 and WO2013/023248 describe the use of switching regulators at each module. Using a PWM signal, the switching regulators allow voltages to be ramped up to or down from the maximum voltage so that the output signal more closely resembles the desired AC signal and the systems describe bypass mechanisms to reduce energy loss while switching regulation is not occurring.

One issue with such a system is the complexity of the switching arrangement and the lower reliability and higher costs that result by having switching regulators in each of the modules or a voltage corrector of the form described.

According to one aspect of the present invention, a system is described having a configuration aimed at reducing this complexity and the resulting reliability and cost issues.

Another issue with such a system relates to the electromagnetic compatibility (EMC) of the system as power sources such as panels are switched. With a reduction of the use of switching regulators within each of the modules, a lower EMC is possible. With the use of longer strings of switched panels driving into a common voltage corrector, lower EMC could reach problematic levels.

Another potential issue with such system is dealing with voltage spikes or surges from the mains. Generally, 240Vac has a contingent maximum voltage rating of 20% above usual voltage with surges reaching potentially 290Vac. It is reasonable to expect the storage devices in this type of system to cope with producing a waveform with voltages that could surge up to 290Vac as current from switching glitches that exceed this voltage are easily absorbed. However, due to the low impedance of the mains and extremely low impedance of the series switched storage devices, higher voltage surges can create damaging high currents into the storage devices.

It is also desirable to have a cost effective and efficient system that can cope with external mains short circuits leading to blown fuses and subsequent high voltage current spikes without being damaged.

Further, in such systems, the DC power sources will often differ in characteristics from module to module. For example, in the case of solar panels forming the DC power sources, the outputs can be affected by shading, panel type, direction, age and other factors. As the modules deliver through a series connection, the output current of each module is necessarily equal but their individual voltages can be quite variable.

The present invention relates to an improved system and method for conversion of DC to AC power aimed at addressing, at least in part, the abovementioned issues.

SUMMARY OF THE INVENTION

According to one aspect of the present invention there is provided a system for converting power comprising:
a plurality of modules each having an input and an output and being connected in series such that the output of any module is connected to the input of a subsequent module, at least one of the modules being connected to at least one DC power source that supplies power to the module;
one or more storage devices in connection with the DC power source such that the power source charges the storage devices;
voltage control circuitry in each module operable to switch the storage device between the input and the output in order to provide a maximum module voltage and a minimum module voltage;
a compensator unit having an input and an output in series with the modules, the compensator unit including a storage device charged by series current within the system and including compensator voltage control circuitry to vary the voltage supplied between the input and output of the compensator;
a control unit in communication with the voltage control circuitry of each of the modules and the compensator unit to control the voltage between the inputs and outputs thereof;
wherein when the control unit operates the voltage control circuitry of a module to vary the supplied voltage by the module, the control unit applies via the compensator voltage control circuitry a corresponding but opposed change in the voltage supplied by the compensator unit and between such variations the control unit ramps up or down the voltage between the input and the output of the compensator unit to output a desired signal.

Preferably the control unit controls the voltage control circuitry of each of the modules such that the series current of the system maintains the charge on the compensator's storage device.

Preferably the voltage control circuitry comprises switching devices connected such the power source can be switched to either provide a voltage between the input and output in a first polarity, provide a voltage between the input and output in a second polarity or be bypassed.

Preferably the control unit receives information from each of the modules such that the control unit can determine the charge on each of the storage devices and therefore the maximum and minimum voltages available to be delivered to the system by switching in or out each of the modules.

In a preferred embodiment, the control unit monitors and stores information regarding capacitances of the storage devices in the modules and charge rates such that control unit may determine the energy stored in each module over time based on information regarding which modules are connected in series at any one time the series current.

Preferably the control unit receives communications from each of the modules regarding stored charge at regular intervals to correct for errors caused in calculating the stored charge over time.

In a preferred embodiment, the ramping up or down of the voltage supplied by the compensator unit uses pulse width modulation.

In one embodiment, the control unit is connected to a control line that communicates information to each of the modules in order to control operation of the switching devices.

In a further embodiment, wireless communication is used to relay information to and/or from the control unit.

Preferably one or more of the modules is provided with a slew rate control circuit provided to slew the output of the module as it changes between the maximum and minimum voltages provided.

Preferably the slew rate control circuitry is provided to slew the voltage changes resulting from switching the storage devices in and out of the series connection of modules at a rate to optimise the EMC from faster switching and the energy losses associated with slower switching.

In a preferred embodiment, the slew rate control circuitry causes the voltage supplied by the module to change between the maximum and minimum values in a time of between 10 µs second and 100 ns.

In a preferred embodiment the slew rate control circuitry causes the voltage supplied by the module to change between the maximum and minimum values over a period of around 1 µs.

In a preferred embodiment, the modules each include a series inductor and parallel resistor provided to reduce signal ringing created during the switching of module.

Preferably a further series inductor and parallel resistor is provided at each end of the series connected modules to further reduce problems associated with EMC.

Preferably the series inductor and parallel resistors provided at the ends of the series connected modules have inductance and/or resistance values at least three times the inductance and/or resistance values of the inductors and resistors provided within the modules.

In accordance with a second aspect of the present invention, there is provided a system for converting power comprising:
a plurality of modules each having an input and an output and being connected in series such that the output of any module is connected to the input of a subsequent module, at least one of the modules being connected to at least one DC power source that supplies power to the module;
one or more storage devices in connection with the power source of each module such that the power source charges the storage devices;
voltage control circuitry in each module operable to switch the storage device between the input and the output in order to provide a maximum module voltage and a minimum module voltage;
a control unit in communication with the voltage control circuitry of each of the modules to control the voltage between the inputs and outputs thereof;
one or more dissipation circuits comprising a dissipation device in parallel with an electronic switch;
one or more sensors to detect overcurrent or overvoltage;
wherein the electronic switch in the dissipation circuit is opened on detection of overcurrent or overvoltage by the sensor to dissipate energy in the dissipation device.

In one embodiment, the dissipation device comprises a metal oxide varistor and the electronic switch comprises one or more FET.

Preferably the metal oxide varistor is selected such that the voltage drop across the metal oxide varistor is less than the maximum voltage for which the FET is rated.

In one embodiment, dissipation circuits and sensors are provided within each of the modules.

Preferably the sensors are provided to detect a plurality of levels and to activate the dissipation circuit either immediately or delayed based on the level detected, the sensors of each of the modules being configured to detect a first level at which the dissipation circuit is activated at a predetermined delay time after detection of the first level and a second level, the second level being greater than the first overcurrent level, at which the dissipation circuit is to be activated without delay.

In accordance with a further aspect of the present invention, there is provided a method for converting power comprising:
controlling operation of a plurality of series connected modules, at least some of said modules including a DC power source and a storage device charged by the power source, such that the storage devices of the modules are switched into the series circuit in to provide a maximum module voltage and a minimum module voltage;
charging a storage device in a compensator unit connected in series with the modules;
applying via the compensator unit a corresponding but opposed change in the voltage when the control unit operates the voltage control circuitry of a module to vary the supplied voltage by the module; and
between such variations ramping up or down the voltage between the input and the output of the compensator unit to output a desired signal.

Preferably the control unit controls the voltage control circuitry of each of the modules such that the series current of the system maintains the charge on the compensator's storage device.

Preferably the power sources in the modules are switched to either provide a voltage between the input and output in a first polarity, provide a voltage between the input and output in a second polarity or be bypassed.

Preferably the control unit receives information from each of the modules regarding the charge on each of the storage devices and therefore determines the maximum and minimum voltages available to be delivered to the system by switching in or out each of the modules.

In a preferred embodiment, the control unit monitors and stores information regarding capacitances of the storage devices in the modules and charge rates such that control unit may determine the energy stored in each module overtime based on information regarding which modules are connected in series at any one time the series current.

Preferably the control unit receives communications from each of the modules regarding stored charge at regular intervals to correct for errors caused in calculating the stored charge over time.

Preferably the ramping up or down of the voltage supplied by the compensator unit is via pulse width modulation.

In one embodiment, the control unit communicates information via a control line to each of the modules in order to control operation of the switching devices.

In a further embodiment, wireless communication is used to relay information to and/or from the control unit.

In a preferred embodiment, one or more of the modules slews the output of the module as it changes between the maximum and minimum voltages provided.

Preferably the voltage changes resulting from switching the storage devices in and out of the series connection are slewed at a rate to optimise the EMC from faster switching and the energy losses associated with slower switching.

Preferably the voltage supplied by the module changes between the maximum and minimum values in a time of between 10 µs second and 100 ns.

Preferably the voltage supplied by the module changes between the maximum and minimum values over a period of around 1 µs.

BRIEF DESCRIPTION OF THE DRAWINGS

The invention will now be described, by way of example, with reference to the following drawings, in which:

FIG. 8a is a fourth embodiment of circuitry of a compensator unit in accordance with the present invention; and FIG. 8b is a fifth embodiment of circuitry of a compensator unit in accordance with the present invention.

DETAILED DESCRIPTION OF PREFERRED EMBODIMENTS

Figure 1:
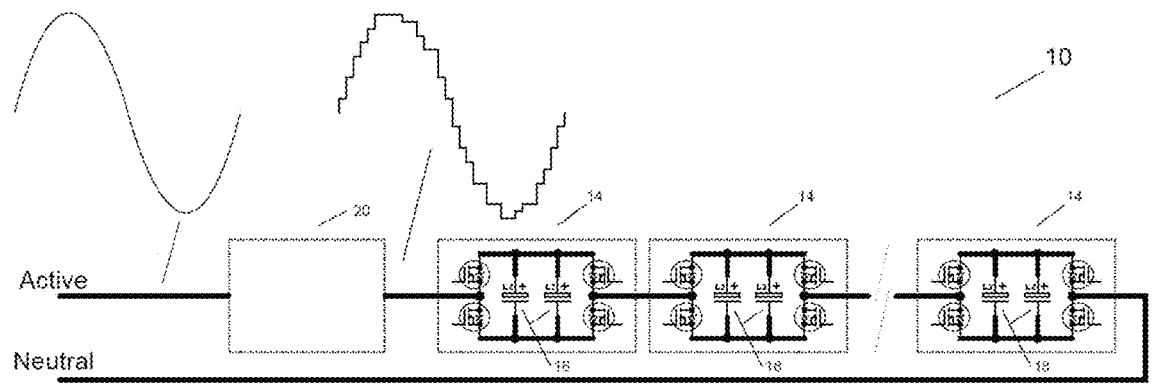
FIG. 1 is a block diagram of a portion of a power conversion system in accordance with the present invention.

The power conversion system 10 is generally of the type described in the applicant's earlier International patent applications WO2012/016285 and WO2013/023248. FIG. 1 is a block diagram representing the general elements the system 10.

The power conversion system 10 includes a plurality of modules 14 each associated with at least one power source. The power sources may be, for example, solar panels or batteries Each of the modules 14 is also provided with a storage device 18 and is connected to the terminals of the power source. The storage devices 18 may comprise electrolytic capacitors or batteries of a type that efficiently and reliably supply pulses of current. The storage devices 18 stores charge from the power source such that when the module 14 is bypassed, power generated by the power source continues to be stored in the storage device 18 for use. The storage devices 18 may be separate from or part of the power source.

Each of these modules 14 has an input and an output. DC voltage can be supplied from the storage device 18 across the input and the output and the modules 14 are to be connected in series such that the output of each module 14 is connected to the input of a subsequent module 14. The power conversion system 10 therefore includes a system input and a system output providing the series voltage across each of the modules 14. That is, the sum of the voltages provided across the inputs and outputs of all of the modules 14.

Each of the modules 14 is provided with voltage control circuitry to vary the voltage supplied across the input and output of the module 14. The module voltage provided across the input and the output may be varied between a maximum module voltage and a minimum module voltage by the voltage control circuitry. The voltage control circuitry may comprise switching devices as described in the applicant's earlier patent applications as mentioned above. The switching devices are connected such the storage device 18 can be switched to either provide a voltage between the input and output in a first polarity, provide a voltage between the input and output in a second polarity or bypassed. Therefore in this embodiment the maximum module voltage is the storage device voltage and the minimum module voltage is the reverse polarity storage device voltage.

In general, as the mains signal voltage increases in the positive portion of its cycle, the modules 14 are switched from the bypass configuration to the configuration in which the storage device 18 is connected in the first (positive) polarity to raise the system output voltage to follow the mains signal. As the mains voltage falls in the positive portion of the cycle, the modules 14 are switched to the bypass mode to lower the total voltage and follow the mains signal. The same occurs during the negative portion of the mains cycle with the modules 14 being switched such that the voltage is supplied in the second (negative) polarity to follow the mains signal. As described in the applicant's abovementioned earlier patents, the modules 14 may alternatively form a rectified AC signal.

The power conversion system 10 is provided with a control unit (not shown) to control operation of the switching devices. The control unit is connected to a control line that communicates information to each of the modules 14 in order to control operation of the switching devices. Wireless communication methods may be used to relay information to and/or from the control unit.

The control unit is in communication with the mains supply to receive information regarding the phase voltage and current of the mains signal and controls the modules such that the AC signal voltage created is in phase with the mains supply and the current is controlled to be suitable for supply to the mains system.

The system 10 includes also a compensator unit 20 provided in series with the modules 14. The compensator unit 20 includes also a storage device 18 and compensator voltage control circuitry 21. The storage device 18 is charged by power sources of the system 10 and supplies voltage in series with the modules 14 via the compensator voltage control circuitry 21, which is controlled by the control unit.

The control unit is in communication with each of the modules 14 and the compensator unit 20. The control unit receives information from each of the modules 14 such that the control unit can determine the charge on each of the storage devices 18 and therefore the maximum and minimum voltages available to be delivered to the system 10 by switching in or out each of the modules 14. The control unit monitors and stores information regarding capacitances of the storage devices in the modules 14, 20 and charge rates. As the control unit has information regarding which modules 14 are connected in series at any one time and also monitors the series current, the control unit may determine the energy stored in each module over time. Further, the control unit also receives communications from each of the modules 14, 20 regarding stored charge at regular intervals to correct for errors caused in calculating the stored charge over time.

The control unit operates the voltage control circuitry of each of the modules 14 to switch the modules between maximum voltage, minimum voltage and zero in order to form a stepwise approximation of an AC signal. A smoother AC signal is generated by operation of the compensator unit 20. While each of the modules 14 is supplying maximum, minimum or zero voltage, the compensator voltage control circuitry 21 operates to ramp up or down the voltage supplied by the compensator unit 20. The rate at which the ramping occurs is so as to follow the rate of change of the desired AC signal. The ramping up or down of the voltage supplied by the compensator unit 20 may be via PWM, as described in the applicant's earlier patent applications.

The control unit controls operation of the compensator unit 20 as each of the modules 14 is switched into, or out of, the series circuit. In particular, as each of the modules 14 is switched from zero to maximum or minimum voltage, or vice versa, the compensator voltage control circuitry 21 of the compensator unit 20 applies a corresponding but opposite change in the voltage level supplied by the compensator unit 20. For example, if the control unit switches a module 14 from zero into the series connection such that the module 14 supplies 40V, then the voltage supplied by the compensator unit 20 is varied to be offset by −40V such that the series output remains relatively constant. The compensator unit 20 then continues to ramp up as before.

Figure 2:
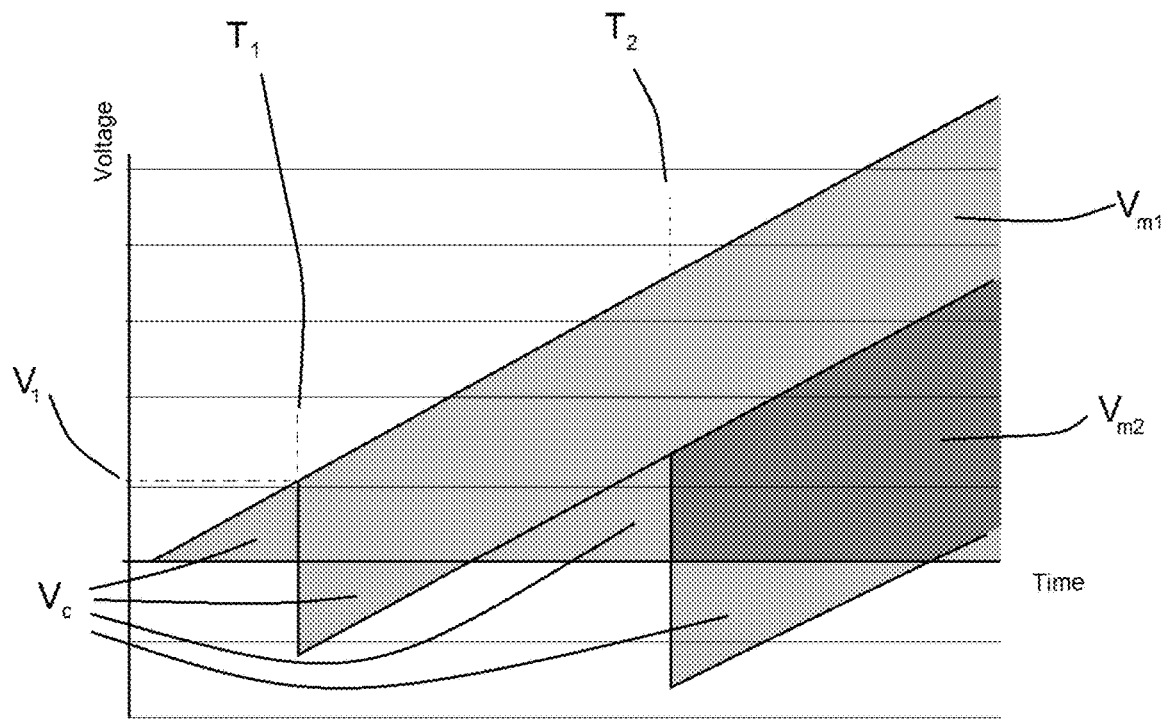
FIG. 2 is a graph showing switching of the compensator unit and modules of the present invention.

FIG. 2 shows an example of two modules 14 being switched into the series connection. Initially the compensator unit 20 is supplying a voltage 'Vc' to the system which is ramped upwardly to match the main signal. At time T1, a first module 14 is switched into the series connection of modules supplying a voltage 'Vm1' to the total voltage. At the same time, the voltage supplied by the compensator 'Vc" is reduced by the same value as the supplied voltage 'Vm1'. The voltage supplied by the compensator unit 20 then continues ramping upwardly again to match the mains signal. At time T2, a further module 14 is switched into the series connection and the compensator unit 20 again decreases the voltage supplied 'Vc' by a corresponding amount.

As the mains signal decreases, the reverse process occurs. Modules 14 are switched out of the series connection, reducing the total voltage supplied by the modules 14. The compensator unit 20 increases the voltage 'Vc' it supplies to allow the total supplied voltage to follow the decreasing mains signal.

Figure 3:
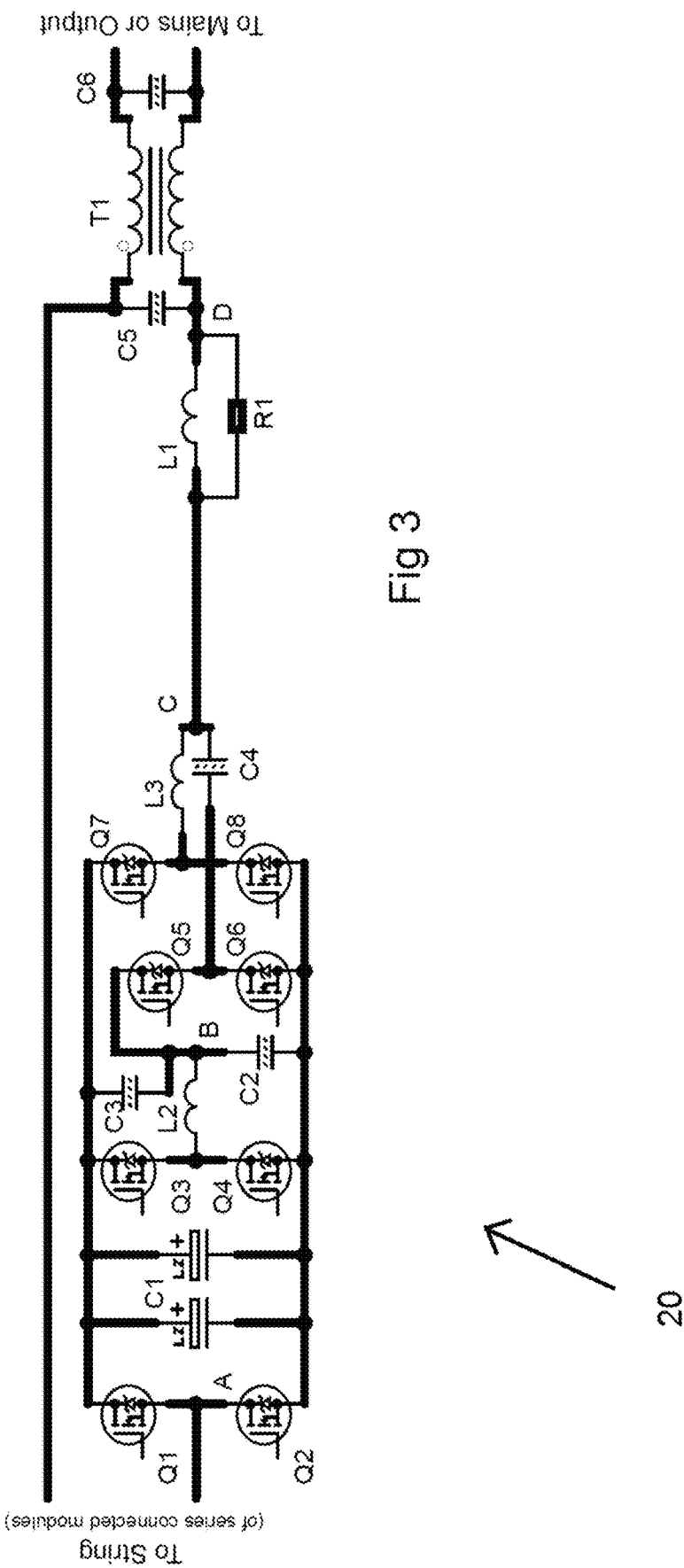
FIG. 3 is an embodiment of circuitry of a compensator unit in accordance with the present invention.

FIG. 3 shows an example of circuitry of a compensator unit in accordance with the present invention. The compensator unit 20 is controlled by the control unit and gets commanded to step or slew. The control unit may be part of the compensator unit 20. The control unit knows how and when series connected modules switch and what directions they will switch while following the mains waveform in a stepwise manner. The compensator unit 20 is commanded so it corrects for the difference between the mains signal and the voltage of the series connected modules 14. That is, if a module 14 switches in forwards at a prescribed time, then the compensator is commanded to switch in reverse at the same time. If the mains voltage is expected to ramp up then the compensator is commanded to ramp up. This is done to keep the series connected voltage of modules 14 plus the compensator unit 20 the same as the mains voltage.

For grid injection, the mains voltage is connected directly across the series connected modules 14 with the compensator unit 20 also being in series. For stand-alone operation, a mains voltage AC sine wave is desired. The compensator unit 20 provides the difference in voltage between a stepwise signal create by the series connected modules 14 switching and the desired sine waveform.

Referring to FIG. 3, electrolytic capacitors C1 form the storage device of the compensator unit 20. Switching devices Q1 and Q2 control a level the storage devices are switched into the circuit. Switching devices Q7 and Q8 provide pulse width modulation (PWM) function to perform ramping up or down of the voltage provided to the system 10 between switching of the modules 14. Switching devices Q3 and Q4 also provide PWM to control the level at B to control the amount by which voltage is stepped and switching devices Q5 and Q6 provide the stepping functions to control stepping up or down in the compensator unit 20 to compensate for the voltage changes when switching modules 14 in or out of the series connection.

With reference to FIG. 3, a positive step means stepping up the voltage at point C or stepping down the voltage at point A or doing both at the same time. For a negative step, the voltage at point C is stepped down or the voltage at point A is stepped up or both at the same time. Voltage is measured with respect to the voltage on the negative of C1.

The compensator unit 20 is controlled by the control unit to provide a number of functions. Firstly, the compensator unit 20 compensates for step voltage changes as modules 14 switch in and out. The compensator unit 20 follows the difference between the shape of the mains voltage and the shape of the waveform of the series connected modules. The compensator unit 20 also compensates for the changes in series connected voltages from the storage devices 18 as series currents charge or discharge them and as the storage devices 18 in the modules 14 are charged by the power sources. The compensator unit 20 also immediately corrects for current changes that occur as a result of steps and locally adjusts its series voltage to control current through the system 10.

Some of these functions are proactive in that the control unit knows when modules 14 will switch, the drop in voltages of capacitors over time and the ramping associated with modules 14 as charging and currents through the system 10 alters the charge stored on storage devices 18 of modules 14. From moment to moment, the compensator voltage is proactively adjusted in the opposite direction compared to changes in the sum of the series connected modules 14.

The function of ramping to follow a mains signal is performed for stand-alone operation or at power up before a relay is dosed connecting the mains signal.

The compensator unit 20 is initially externally powered but becomes loop powered by switching in circuit forwards or reverse once current is flowing in the system. During stand-alone operation, it is desired to remain loop powered. Current sufficient to loop power the compensator is provided by mains rated capacitors C5 and C6 being provided across the series connection. Under no load conditions, the control unit arranges the modules to provide power to the compensator out of phase with the voltage being provided so that the compensator is charged by the reactive current of the mains rated capacitors Other functions are reactive. The compensator unit 20 monitors the voltage that develops across L1 continually but particularly immediately after a switch step occurs and drives the voltage on C (by adjusting the PWM of Q7/Q8) to rapidly correct for errors associated with the switch (timing and step size differences between switching modules and the compensator are examples of what can lead to these errors). Also, the compensator unit 20 monitors the current through the system using a resistive or magnetic current sensor (not shown) and increases or decrease the voltage on C (by adjusting the PWM of Q7/Q8) to alter the current through the system.

The compensator unit 20 can provide a step size which can vary from zero to two times the voltage on C1. It can slew from nearly the negative voltage on C1 to nearly the positive voltage on C1. At the extremities, slew rate is limited by the PWM reaching 0 or 100%. The compensator can slew cleanly through nearly +/−200% of PWM range. The compensator slews up 200% by ramping from 0 to 100% when the voltage on A is high (Q1 on) then a stepping back to 0% as it sets the voltage on A low (turns Q1 off and Q2 on) and further ramps up to 100%. The step back to 0% must first be made ready and then the step is done. The voltage on Q5, Q6 junction is known to the controller. To make the step ready, when A is high and before the PWM reaches 100%, the step voltage B is ramped to the voltage at the junction Q5, Q6 and Q5 is turned on to lock C4 to B. When the PWM reaches 100%, the PWM is stepped to 0% and the voltage on the left of C4 is stepped down by turning Q5 off and Q6 on. The reverse happens when slewing down 200%.

The inductor L1 of the compensator unit 20 rejects changes in current when the compensator unit 20 corrects for a step change. R1 is chosen to equal a characteristic impedance of a typical series connected system so it optimally absorbs the energy resulting from the momentary change of voltage. The compensator unit 20 proactively prevents changes in current during panel switches by accurately controlling its switching time. Switching 100 ns earlier or later with a step of 60V and L1=10 uH results in around a +/−600 mA adjustment of momentary change in current.

The compensator unit 20 reactively corrects for voltage step resultant changes of current in three ways. Firstly, the compensator unit 20 monitors the voltages C and D before and after a switch and drives C to rapidly correct for switching errors that occur. Importantly, correcting for switching errors also includes proactively momentarily driving the voltage further than is needed to undo the difference in voltage between C and D. Momentarily driving the voltage further helps to reverse the effect of the switching error. Secondly, the compensator unit 20 monitors current changes and rapidly responds to unexpected current changes by adjusting its voltage on C to counteract the current changes. Thirdly, the compensator unit 20 keeps a record of previous current changes that occurred and adjusts its subsequent switching times (in relation to switchers) to minimize the step change of current that results.

Capacitor C5 is resistant to momentary voltage changes and enables the compensator unit 20 to correct for switching errors before the effect of the error are communicated through common mode choke T1 to the mains. Common mode choke T1 is provided in circuit to prevent unacceptable common mode switching step impulses from entering the mains. Common mode choke T1 and capacitors C5 and C6 help prevent unacceptable differential voltages from entering the mains.

When controlling the voltage at B to set the step voltage, there are a number of a factors to be considered. Firstly, it is desired to ramp point B ready to do steps of the voltage applied by the compensator 20 using the least amount of energy. Efficiency is improved by disabling both Q3 high and Q4 low FETs while idle. Also, initial and final voltage pulses improve the efficiency by removing unnecessary PWM cycles.

Also, the ramping need to be relatively quick during certain periods, such as during high mains slew rates as the step voltage must rapidly get ready for subsequent steps. Rapid slew is achieved avoiding ringing by moving from one voltage to another following a raised cosine curve (raised cosines are known from FFT windowing). A preferred alternative to raised cosine is to initially start current flowing by introducing a pulse of voltage to the inductor, the total period of the pulse usually exceeding the PWM period. The pulse period is calculated from the desire slew rate using the voltage and values of C2, C3 and L2. After the initial pulse, the PWM is ramped fairly linearly to match the rate to slew and finally an opposite pulse is done to stop the current flow. The opposite pulse is deactivated slightly before the period to ensure the slew stops in the minimum possible time and does not reverse. The control unit reads the voltage after the slew has completed and may perform subsequent smaller steps to make the voltage on B more accurate or appropriate for the step to come. Further, referred voltage from the slew of B effects the voltage on C while Q5 is on. The compensator reduces the effect of this by slewing at a slower rate and/or by correcting the PWM on Q7 and Q8.

The storage device C1 of the compensator is discharged when the compensator unit 20 is switched in series forwards (with the current flow) and charged when it is switched in reverse (against the current flow).

The control unit controls the voltage control circuitry of each of the modules 14 such that the series current of the system maintains the charge on the storage device 18 of the compensator unit 20. The control unit generally causes the compensator unit 20 to switch in series reverse earlier and stay in series longer to increase its charge and vice versa to decrease its level of charge. The control unit operates with an AC target voltage that causes modules to be switched to follow the main signal, to increase the average time the compensator is switched in reverse, the control unit increases this AC target voltage.

The control unit controls the system such that the storage device 18 of the compensator unit 20 maintains a headroom level. The headroom level comprises a voltage level above the maximum voltage level at which a modules 14 may be switched into the system. The headroom level is provided to allow for spikes or surges on the mains such that these increases can be compensated for by the compensator unit 20. As the compensator runs out of headroom, the control unit may choose to swap to a higher voltage module rather than adding another module. To swap a panel, the compensator first configures to do a small step (the step size being the difference between the two panel voltages) and then both modules are swapped over at the same time as the compensator does the small step The compensator unit 20 cleanly slews the PWM of Q7, Q8 down through its midpoint at 0% with Q2 on to 100% with Q1 on by doing a full positive step of Q5 to Q6 at the same time. The step size must be set to 100% for a dean slew through to 100%. When the step size is less than 100%, for instance when the compensator unit 20 is compensating for a module 14 being switched, then the control unit ensures a step of the compensator unit 20 does not land or start around its midpoint. This is required due to the finite time that is required to reconfigure step voltages from the step required for a module switch to 100% and vice versa.

Figure 6:
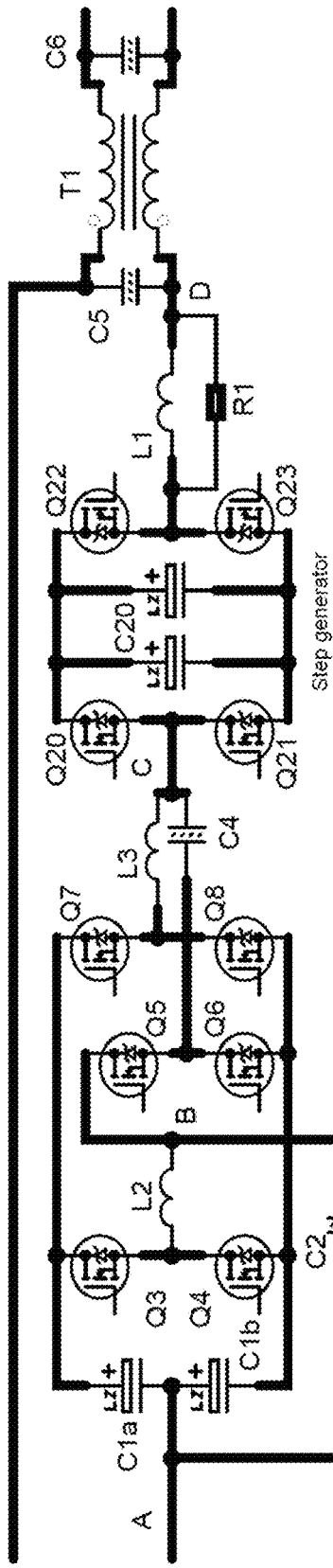
FIG. 6 is a second embodiment of circuitry of a compensator unit in accordance with the present invention.

FIG. 6 shows an alternative embodiment of the compensator unit 20 that overcomes the midpoint switching restriction. In this embodiment, there is no switching on the left hand side, instead, a higher overall voltage is used and point A drives the common point of C1a, C1b. The arrangement has slew control added to Q5, Q6. To improve EMC in this embodiment, slew ramping of Q5, Q6 occurs generally equal and opposite to the ramping of the modules 14.

A separate switching regulator (not shown) could be used to move charge between C1a and C1b. In this embodiment, charge is moved between C1a and C1b by re-using the switching regulator Q3, Q4, L2. It is re-used by switching on Q9a, Q9b to connect the switching regulator to A. When the step voltage B is not required for stepping, the voltage on B is set to match the voltage on A. Then Q9a and Q9b are switched on allowing current to flow so charge can be moved between C1a and C1b. The overall charge of C1a, C1b is increased by the control unit switching the compensator unit 20 in circuit to receive power while C has a different voltage to A. The control unit charges the compensator unit 20 by keeping it in circuit with an average DC bias and moves charge between C1a and C1b by the process of activating Q9a, Q9b as described above.

Q20 to Q23 with C20 of FIG. 6 show a reversible step generator. This can be used in series with any embodiment of the compensator unit 20 to reduce the required slew and switching voltages in half. The reversible step generator is bypassed by switching on Q21, Q23. When in use, the reversible step generator doubles the number of steps a compensator unit 20 makes but significantly improves efficiency by reduce the operating voltage of the compensator unit 20 to a little over half. The control unit controls the voltage on C20. The voltage is increased by switching it in circuit in reverse and decreased by switching it the other way. The control unit charges C20 to a voltage that is about 25% of the maximum step size of the modules 14. To perform a large step when compensating for a high voltage module switch, the control unit causes the polarity of C20 to be swapped by swapping around Q20-Q23 at the same time as the compensator unit 20 does its step by swapping Q5, Q6. To get ready for a next large step, the compensator unit 20 ramps and does a step of the same size as the step generator in the opposite direction of the ramp while the reversible step generator also 'reverses' its last step. The compensator unit 20 then continues ramping.

Figure 7:
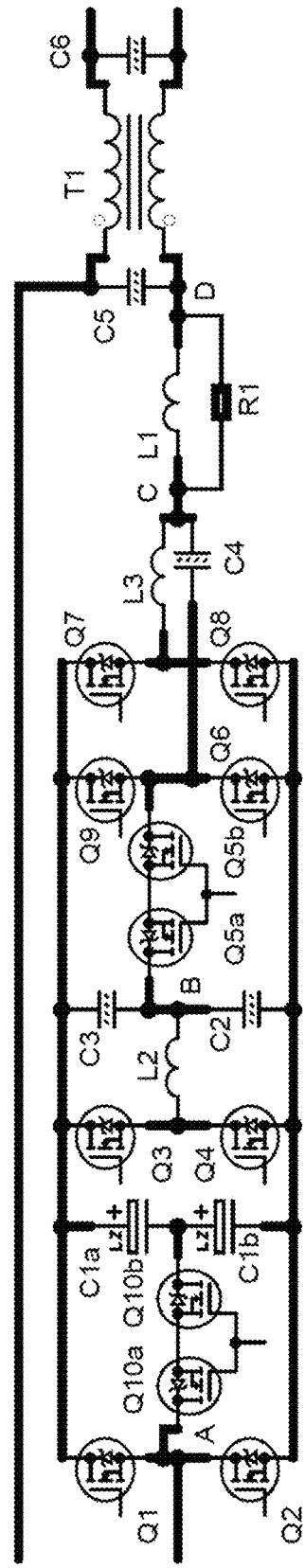
FIG. 7 is a third embodiment of circuitry of a compensator unit in accordance with the present invention.

FIG. 7 shows another alternative arrangement of a compensator unit 20 that provides two ways for overcoming the midpoint slew restriction of FIG. 3. The first alternative adds Q10a, Q10b to provide alternative step options for the control unit. To avoid stepping to a PWM of 0% (or 100%), the control unit causes the compensator unit 20 to do partial steps by switching to the mid-point of C1a, C1b, slewing further while setting up a subsequent step then stepping the rest of the way, usually in the same direction. The smaller, intermediate steps can generally be used to improve EMC and to more accurately match the voltage of the compensator unit to the modules 14. Q9 is included as an alternative or addition to using Q10a, Q10b. The compensator unit 20 adjusts the voltage on point B to be optimal for the desired step after first ramping to match B to the voltage on the junction of Q9. Q6 allowing Q5a and Q5b to be turned on connecting C4 to B. When it comes time to do the step, the control unit chooses to step positive by turning on Q9, or negative by turning on Q6. By this arrangement, the compensator unit 20 is able to immediately follow a midpoint step with ramping in either positive or negative direction by having the option of a subsequent 100% step. The 100% step is done by stepping between Q9 and Q6 whilst swapping Q1 and Q2 at the same time.

FIG. 8a shows a compensator unit that is formed from an adjustable voltage reversible step generator. Q34, Q35 with L30 and C30 form a switching regulator. The switching regulator controls the voltage on the drains of Q30 and Q32 and may be ramped from 0% to 100% or vice versa. Steps and charge control operate similarly to the reversible step generator of FIG. 6. This compensator unit arrangement has the same slew and step features but is easily made at a lower cost, and more efficient than the compensator units of FIGS. 3 to 7.

Operation will be described by way of example. Initially consider starting with Q31, Q32 on and switching regulator Q34, Q35 set to p %. The voltage on C is higher than the voltage on A by the voltage of C31×p %/100. If there is a need to slew from p % down through 0% to q % in the opposite direction, this involves ramping Q34, Q35 down to 0%, swapping Q31, Q32 to Q30, Q33 and then ramping up again to q %. When q % is reached, Q30, Q33 are swapped back to Q31, Q32 doing a step. When the step is done, a full cycle has been completed. In operation, the control unit chooses q % so the voltage on A2 is half the voltage of a module to be switched and the ramping rate is chosen to match the waveform. In this embodiment, the current flowing in the system from A to C also flows through the inductor L30 and reverses when Q30, Q33 are swapped to Q31, Q32 and back. The reversal of current can cause unacceptable voltage pulses on C30 and ringing of the voltage A2. FIG. 8b shows an arrangement for overcoming this issue.

FIG. 8b shows a compensator unit 20 formed from an adjustable voltage reversible step generator. Q34 to Q39 act as a double pole switch and the control unit swaps the polarity of the inductor at the same time as Q30 to Q33 are swapped. This prevents the voltage pulses and associated ringing on C30. The circuit of FIG. 8b is powered by an external source as its symmetrical switching nature when used as a compensator unit 20 prevents it being loop powered.

Two series connected compensator units 20 of the type shown in FIG. 8b are well suited to the high dV/dt of 1000Vac strings of solar farms. By having two units, the high dV/dt as the AC voltage slews through 0V is shared with both compensator units slewing at the same time. In operation both are in intimate communication with each other and each controls half of the string. During the high slew rate, each creates their own part of the mains AC waveform in partnership with the strings of modules they control. The two compensator units work together to do small steps for correcting double panel swaps with one ramping up while the other ramps down getting ready to do small steps. They taking turns adjusting their power levels by swapping in series to charge or discharge. The compensator units 20 work together to adjust their power levels. They control their power levels while the dV/dt is lower towards the top and bottom of the waveform.

The system described provides reduced complexity in comparison to the use of switching regulators within each of the modules 14. However, the possibility of decreased EMC is introduced by the step switching of the modules 14.

In order to prevent reduced EMC related to switching, each of the modules 14 is provided with a slew rate control circuit. The slew rate control circuit is provided to slew the output of the module 14 as it changes between the maximum and minimum voltages provided.

The slew rate control circuitry is provided to slew as the voltage increases and decreases resulting from switching the storage devices 18 in and out of the series connection of modules 14. The slew rate is chosen to optimise between worse EMC related to faster switching and the energy losses associated with slower switching. The slew rate control circuitry causes the voltage supplied by the modules 14 to change between the maximum and minimum values in a time of between 100 ns and 10 µs. A time of around 1 µs is preferred.

Figure 4A:
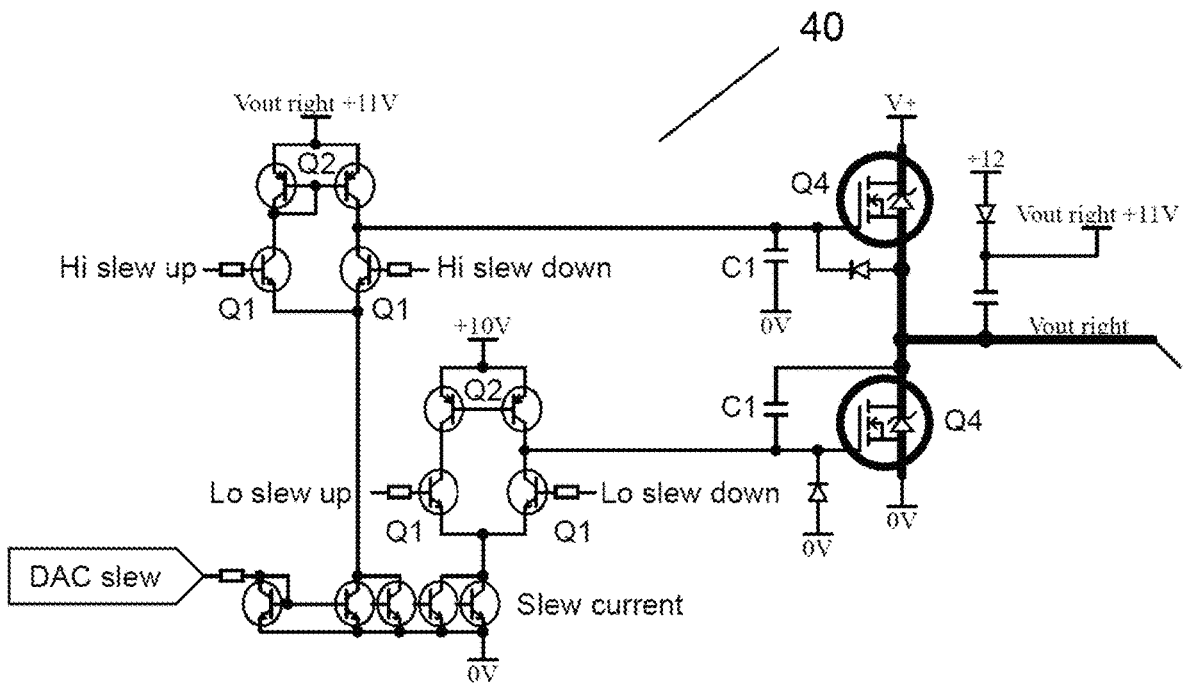
FIG. 4a is a schematic of slew rate circuitry showing functional aspects of the circuitry.
Figure 4B:
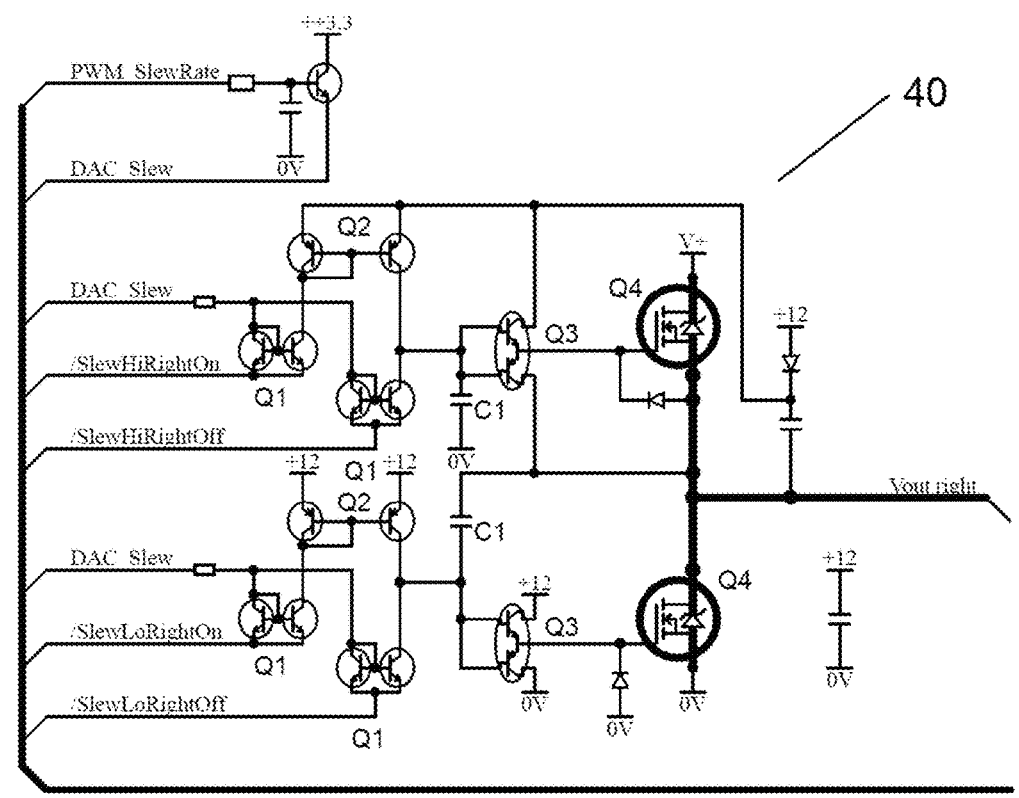
FIG. 4b is an embodiment of slew rate circuitry for one of the modules of the system.

FIG. 4 shows an example of circuitry within one of the modules 14 comprising the slew rate control circuitry 40. The slew rate control circuitry 40 creates the slew by feeding current into slew rate limiting capacitors C1. Current is controllable and steered to charge or discharge the capacitors by switches Q1, charging current is reflected to enable high going slew by current mirrors Q2 and slew current is buffered by Q3 to quickly drive high capacitances of FETs Q4. A local controller drives the slew of capacitor constantly at high current while slew is in progress and long enough to fully turn the FETs Q4 on (or off). After the FETs Q4 are fully turned on (or off), the local controller pulses the slew circuitry to keep the holding capacitors C1 charged or discharge but with low enough PWM to significantly reduce heating and improve efficiency Referring to FIG. 4a, he downward slew of the high FET is done by holding a positive on 'Hi slew down' followed by a positive pule on 'Lo slew down'. Slew up is the reverse and done by holding a positive on 'Lo slew up', followed by a positive pulse on 'Hi slew up'.

Slew current is adjusted to alter the slew rate and may be adjusted during the transition to further improve EMC by rounding the transitions to and from slewing. Slew current and hence slew rate is jittered from step to step so higher frequency EMC is spread across multiple frequencies. Also the control unit avoids switching modules at regular periods to improve low frequency EMC.

To further improve EMC, each of the modules 14 includes a series inductor and parallel resistor provided to reduce signal ringing potentially created during the switching of modules 14. A further series inductor and parallel resistor is provided at one or both of the end of the series connected modules to further improve EMC. The series inductor and parallel resistors provided at the ends of the series connected modules 14 have inductance and resistance values at least three times the inductance and resistance values of the inductors and resistors provided within the modules.

In one embodiment, for example, the series inductor and parallel resistor for each module 14 have values of 470 nH and 18Ω and the series inductors and parallel resistors provided at the ends of the series connected modules 14 have values of 10 μH and 100Ω and are incorporated in the compensator as L1 and R1 and incorporated in an end connector (not shown).

Figure 5:
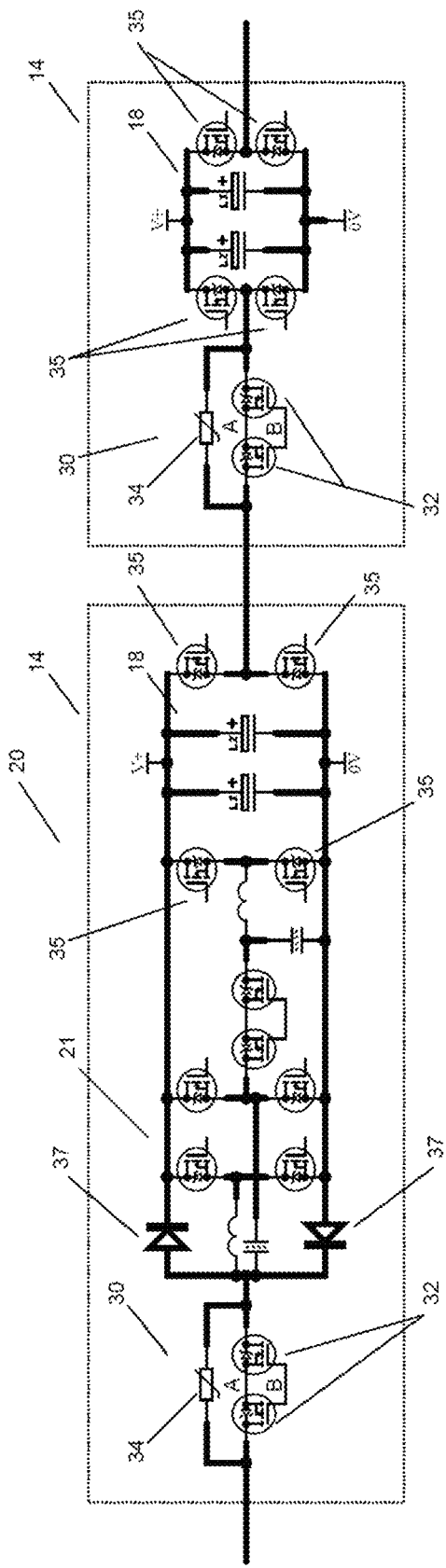
FIG. 5 is an embodiment of a protection circuit for the present invention.

A further issue to be dealt with by the present system 10 relates to mains voltage surges or spikes that can create high currents within the system. Referring to FIG. 5. the system 10 includes at least one dissipation circuit 30 that can operate in series with the module current flow. The dissipation circuit 30 comprises a dissipation device in parallel with one or more an electronic switches. In the embodiment shown the electronic switches comprise back to back FETs 32 with common sources and the dissipation device comprises a metal oxide varistor (MOV) 34. The dissipation circuit 30 protects against voltage surges when either an overvoltage or overcurrent is detected by a sensor provided within the system 10. The switch is in series with mains power and is switched OFF by setting the voltage B to A to 0v to protect the system against damage.

When the system detects a surge or spike, the electrical switch 32 is opened such that current flows through the MOV 34. The MOV 34 is selected such that the voltage drop across the MOV 34 at full current is less than the maximum voltage for which the switch 32 is rated. The switch 32 is thereby protected by the MOV 34 against damage and the MOV 34 dissipates energy during the surge or spike.

Dissipation circuits of this type may be provided as part of protection circuits within each of the modules 14, where the protection circuits include other means for protection of devices within the system. The protection circuits include also means for activating the slew control rate control circuitry 40 to turn off FETs 35. FETs 35 are turned off rapidly (at maximum slew) so that series current caused by a surge or spike from the mains is absorbed by the storage devices 18. The local controller monitors the voltage on storage devices 18 and prevents damage of the module from excess voltage by switching the lower devices 35 to 0V activating the bypass mode before over voltage damage occurs, the bypass mode continues until the local controller can determines the current has dropped to a level that will not cause damage or until completion of the mains cycle. In this way lesser charged modules continue absorbing energy and generally enough modules remain out of bypass mode to resist the surge voltage. Diodes 37 are added between the protection device 30 and power supply rails of the compensator to protect the associated switching circuit.

The modules 14 include a current sensor provided to control operation of the protection circuit. The sensors are provided to detect a plurality of levels and to activate the protection circuit either immediately or delayed based on the level detected. The sensors of each of the modules 14 are configured to detect a first level at which the protection circuit is activated at a predetermined delay time after detection of the first level. The sensors are also configured to detect a second level, the second level being greater than the first level, at which the protection circuit is to be activated without delay.

This arrangement ensures that when the protection circuit on one of the modules is activated by the first overcurrent level but time is allowed to ensure that the overcurrent sensors of each of the other modules 14 also detect the overcurrent and activate their protection circuits. However, if the overcurrent exceeds the second overcurrent level, being a level closer to a level where damage would be caused to components of the module 14, then the protection circuit is immediately activated. The time period is adjustable according to the level of overcurrent, the time remaining being long enough to ensure all modules detect the overcurrent and short enough to protect against damage. This therefore allows energy caused by the overcurrent event to be absorbed and/or dissipated evenly throughout the system 10. Activation of the protection circuit on sensing of the second overcurrent level is preferably performed in hardware within the module 14, rather than under the control of a local controller or the control unit.

It will be readily apparent to persons skilled in the relevant arts that various modifications and improvements may be made to the foregoing embodiments, in addition to those already described, without departing from the basic inventive concepts of the present invention.

The invention claimed is:

1. A system for converting power comprising:
 a plurality of modules each having an input and an output and being connected in series such that the output of any module is connected to the input of a subsequent module, at least one of the modules being connected to at least one DC power source that supplies power to the module;
 one or more storage devices in connection with the at least one DC power source such that the at least one DC power source charges the storage devices;
 voltage control circuitry in each module operable to switch the storage device between the input and the output in order to provide a maximum module voltage and a minimum module voltage;
 a compensator unit having an input and an output in series with the modules, the compensator unit including a storage device charged by series current within the system and including compensator voltage control circuitry to vary the voltage supplied between the input and output of the compensator unit, wherein the compensator unit is configured to compensate for voltage changes when switching modules in or out of the series connection;

a control unit in communication with the voltage control circuitry of each of the modules and the compensator unit to control the voltage between the inputs and outputs thereof;

wherein the control unit is configured such that when the control unit operates the voltage control circuitry of the modules to vary the supplied voltage by the module in order to form a stepwise approximation of an AC signal comprising multiple sequential increasing steps and multiple sequential decreasing steps, the control unit applies, via the compensator voltage control circuitry, corresponding but opposed changes of the same value in the voltage supplied by the compensator unit, and wherein the control unit is configured such that, between such variations, the control unit ramps up or down the voltage between the input and the output of the compensator unit to output a desired signal.

2. The system in accordance with claim 1, wherein the control unit controls the voltage control circuitry of each of the modules such that the series current of the system maintains the charge on the compensator's storage device.

3. The system in accordance with claim 1, wherein the voltage control circuitry comprises switching devices connected such that the at least one DC power source can be switched to either provide a voltage between the input and output in a first polarity, provide a voltage between the input and output in a second polarity or be bypassed.

4. The system in accordance with claim 3, wherein the control unit receives information from each of the modules such that the control unit can determine the charge on each of the storage devices and therefore the maximum and minimum voltages available to be delivered to the system by switching in or out each of the modules.

5. The system in accordance with claim 4, wherein the control unit monitors and stores information regarding capacitances of the storage devices in the modules and charge rates such that control unit may determine the energy stored in each module over time based on information regarding which modules are connected in series at any one time the series current.

6. The system in accordance with claim 5, wherein the control unit receives communications from each of the modules regarding stored charge at regular intervals to correct for errors caused in calculating the stored charge over time.

7. The system in accordance with claim 6, wherein the ramping up or down of the voltage supplied by the compensator unit uses pulse width modulation.

8. The system in accordance with claim 1, wherein the control unit is connected to a control line that communicates information to each of the modules in order to control operation of the switching devices.

9. The system in accordance with claim 1, wherein wireless communication is used for at least one of relaying information to the control unit and relaying information from the control unit.

10. The system in accordance with claim 1, wherein one or more of the modules is provided with a slew rate control circuit provided to slew the output of the module as it changes between the maximum and minimum voltages provided.

11. The system in accordance with claim 10, wherein the slew rate control circuitry is provided to slew the voltage changes resulting from switching the storage devices in and out of the series connection of modules at a rate to optimise an EMC from faster switching and the energy losses associated with slower switching.

12. The system in accordance with claim 11, wherein the slew rate control circuitry causes the voltage supplied by the module to change between the maximum and minimum values in a time of between 10 µs second and 100 ns.

13. The system in accordance with claim 12, wherein the slew rate control circuitry causes the voltage supplied by the module to change between the maximum and minimum values over a period of around 1 µs.

14. The system in accordance with claim 1, wherein the modules each include a series inductor and parallel resistor provided to reduce signal ringing created during the switching of module.

15. The system in accordance with claim 14, wherein a further series inductor and parallel resistor is provided at each end of the series connected modules to further reduce problems associated with EMC.

16. The system in accordance with claim 15, wherein the series inductor and parallel resistors provided at the ends of the series connected modules have inductance values or resistance values at least three times the inductance values or resistance values, respectively, of the inductors and resistors provided within the modules.

17. A system for converting power comprising:
a plurality of modules each having an input and an output and being connected in series such that the output of any module is connected to the input of a subsequent module, at least one of the modules being connected to at least one DC power source that supplies power to the module;
one or more storage devices in connection with the at least one DC power source of each module such that the at least one DC power source charges the storage devices;
voltage control circuitry in each module operable to switch the storage device between the input and the output in order to provide a maximum module voltage and a minimum module voltage;
a control unit in communication with the voltage control circuitry of each of the modules to control the voltage between the inputs and outputs thereof;
a compensator unit having an input and an output in series with the modules, the compensator unit including a storage device charged by series current within the system and including compensator voltage control circuitry to vary the voltage supplied between the input and output of the compensator unit, wherein the compensator unit is configured to compensate for voltage changes when switching modules in or out of the series connection;
wherein the control unit is configured such that when the control unit operates the voltage control circuitry of the modules to vary the supplied voltage by the module in order to form a stepwise approximation of an AC signal comprising multiple sequential increasing steps and multiple sequential decreasing steps, the control unit applies, via the compensator voltage control circuitry, corresponding but opposed changes of the same value in the voltage supplied by the compensator unit, and
one or more dissipation circuits comprising a dissipation device in parallel with an electronic switch;
one or more sensors to detect overcurrent or overvoltage;

wherein the electronic switch in the dissipation circuit is opened on detection of overcurrent or overvoltage by the sensor to dissipate energy in the dissipation device.

18. The system in accordance with claim 17, wherein the dissipation device comprises a metal oxide varistor and the electronic switch comprises one or more FET.

19. The system in accordance with claim 18, wherein the metal oxide varistor is selected such that the voltage drop across the metal oxide varistor is less than the maximum voltage for which the FET is rated.

20. The system in accordance with claim 17, wherein dissipation circuits and sensors are provided within each of the modules.

21. The system in accordance with claim 20, wherein the sensors are provided to detect a plurality of levels and to activate the dissipation circuit either immediately or delayed based on the level detected, the sensors of each of the modules being configured to detect a first level at which the dissipation circuit is activated at a predetermined delay time after detection of the first level and a second level, the second level being greater than the first overcurrent level, at which the dissipation circuit is to be activated without delay.

22. A method for converting power comprising:
controlling operation of a plurality of series connected modules, at least some of said modules including a DC power source and a storage device charged by the power source, such that the storage devices of the modules are switched into the series circuit to provide a maximum module voltage and a minimum module voltage;
charging a storage device in a compensator unit having an input and an output connected in series with the modules, wherein the storage device is charged by series current within the system, and wherein the compensator unit is configured to compensate for voltage changes when switching modules in or out of the series connection;
applying via the compensator unit a corresponding but opposed change in the voltage when the control unit operates voltage control circuitry of the compensator unit to vary the supplied voltage between the input and output of the compensator unit;
wherein the control unit is configured such that when the control unit operates the voltage control circuitry of the modules to vary the supplied voltage by the module in order to form a stepwise approximation of an AC signal comprising multiple sequential increasing steps and multiple sequential decreasing steps, the control unit applies, via the compensator voltage control circuitry, corresponding but opposed changes of the same value in the voltage supplied by the compensator unit; and
between such variations ramping up or down the voltage between the input and the output of the compensator unit, outputting a desired signal.

23. The method in accordance with claim 22, wherein the control unit controls the voltage control circuitry of each of the modules such that the series current of the system maintains the charge on the compensator's storage device.

24. The method in accordance with claim 23, wherein the power sources in the modules are switched to either provide a voltage between the input and output in a first polarity, provide a voltage between the input and output in a second polarity or be bypassed.

25. The method in accordance with claim 24, wherein the control unit receives information from each of the modules regarding the charge on each of the storage devices and therefore determines the maximum and minimum voltages available to be delivered to the system by switching in or out each of the modules.

26. The method in accordance with claim 25, wherein the control unit monitors and stores information regarding capacitances of the storage devices in the modules and charge rates such that control unit may determine the energy stored in each module over time based on information regarding which modules are connected in series at any one time the series current.

27. The method in accordance with claim 26, wherein the control unit receives communications from each of the modules regarding stored charge at regular intervals to correct for errors caused in calculating the stored charge over time.

28. The method in accordance with claim 27, wherein the ramping up or down of the voltage supplied by the compensator unit is via pulse width modulation.

29. The method in accordance with claim 22, wherein the control unit communicates information via a control line to each of the modules in order to control operation of the switching devices.

30. The method in accordance with claim 22, wherein wireless communication is used for at least one of relaying information to the control unit and relaying information from the control unit.

31. The method in accordance with claim 22, wherein one or more of the modules slews the output of the module as it changes between the maximum and minimum voltages provided.

32. The method in accordance with claim 31, wherein the voltage changes resulting from switching the storage devices in and out of the series connection are slewed at a rate to optimise an EMC from faster switching and the energy losses associated with slower switching.

33. The method in accordance with claim 32, wherein the voltage supplied by the module changes between the maximum and minimum values in a time of between 10 μs second and 100 ns.

34. The method in accordance with claim 33, wherein the voltage supplied by the module changes between the maximum and minimum values over a period of around 1 μs.

* * * * *